United States Patent [19]

Esposito

[11] Patent Number: 4,606,157
[45] Date of Patent: Aug. 19, 1986

[54] SHADE ARRANGEMENT FOR SOLAR GREEN-HOUSES AND THE LIKE

[75] Inventor: Christopher Esposito, West Bay Shore, N.Y.

[73] Assignee: Four Seasons Solar Products Corp., Farmingdale, N.Y.

[21] Appl. No.: 613,339

[22] Filed: May 23, 1984

Related U.S. Application Data

[63] Continuation-in-part of Ser. No. 455,475, Jan. 4, 1983.
[51] Int. Cl.⁴ .............................................. E04H 14/00
[52] U.S. Cl. ..................................... 52/173 R; 47/17; 160/273 R; 160/310
[58] Field of Search ............... 160/265, 266, 270, 271, 160/272, 273 R, 310; 47/17; 52/173 R

[56] References Cited

U.S. PATENT DOCUMENTS

| | | | |
|---|---|---|---|
| 3,051,232 | 8/1962 | Lamb | 160/273 R X |
| 3,460,602 | 8/1969 | Hugus | 160/310 X |
| 3,768,540 | 10/1973 | McSwain | 160/273 R X |
| 4,372,367 | 2/1983 | Baldanello et al. | 160/310 |
| 4,390,054 | 6/1983 | Niibori et al. | 160/265 |

*Primary Examiner*—Carl D. Friedman
*Attorney, Agent, or Firm*—Roberts, Spiecens & Cohen

[57] ABSTRACT

A solar greenhouse construction is provided in which a glazing is supported by a supporting frame to define an enclosed space. The glazing is permeable to solar radiation. A shade is provided for being drawn across the glazing to intercept the solar radiation. A motor driven roller is connected to one end of the shade to play out the shade or wind the same up. To the other end of the shade is connected a constant force or constant torque device which overcomes friction and keeps the shade stretched out. This device consists of a coiled up spring which is reverse wound onto a roller to which is connected a cable connected to the shade.

23 Claims, 8 Drawing Figures

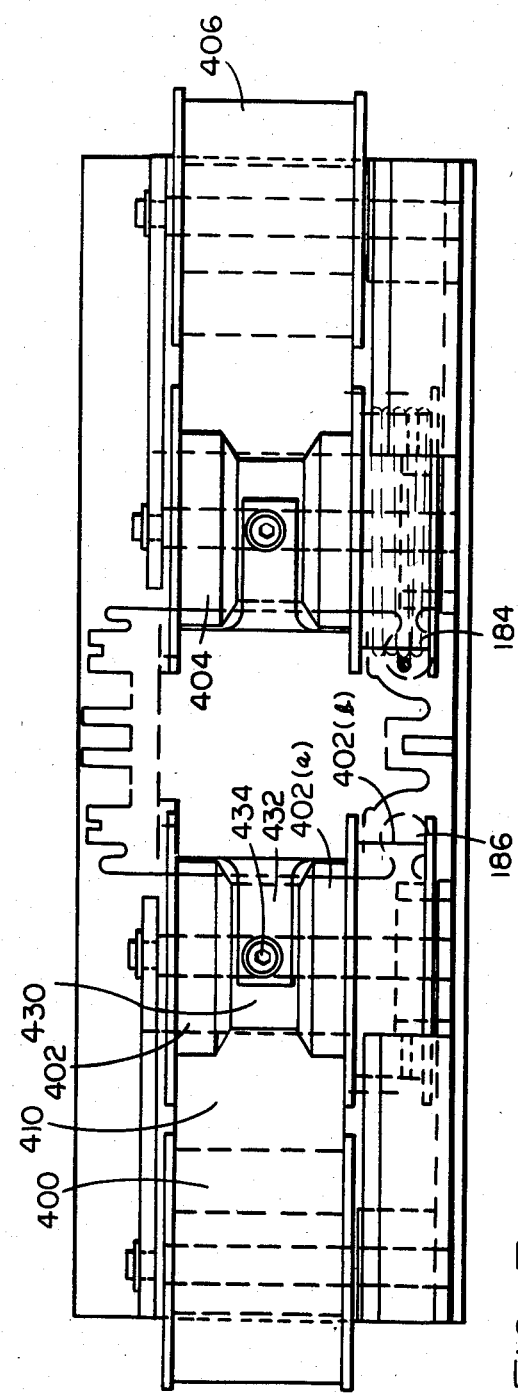

SHADE ARRANGEMENT FOR SOLAR GREEN-HOUSES AND THE LIKE

OTHER APPLICATIONS

This application is a continuation-in-part of my earlier filed copending application Ser. No. 455,475 filed Jan. 4, 1983 pending.

FIELD OF INVENTION

This invention relates to improvements in shading arrangements for solar greenhouses and the like and more particularly to improved arrangements suitable for providing movement and positioning for shading and like types of members which are to be displaced to form a shield against solar radiation or the like.

BACKGROUND

Systems are available for providing selective shading for solar greenhouses and the like. In one known arrangement, a shade is transferred from one motor-driven roller towards a second motor-driven roller by straps which are fastened to the leading edge of a shade, these straps being attached to one of the rollers and being wound upon the same to draw the shade from the other roller upon which the shade is coiled and normally stored. In addition, the leading edge of the shade is provided in the form of a rigid member, the edges of which are guided in a channel provided in a guiding member which has no structural function and is intended solely for the purpose of being a shade guide.

An inspection of the available system reveals that the leading rigid element of the aforegoing system extends laterally beyond the lateral edges of the shade so that the lateral edges of the shade are spaced from the guide and thus provide means for an inadvertent passage of solar radiation or the like between the guides and the shade edges. It is also to be noted that the guides have no structural function to be performed as has been noted hereinabove, and that the guides are generally mounted inwardly of the solar greenhouse structure in such a manner as to be readily receptive of inadvertent damaging forces or the like. Moreover, it will be noted that the shade is inconveniently positioned with its lateral edges subject to damage and deterioration.

Also previously available are shades having lateral edges into which are incorporated wires or cables or the like which give to these lateral edges a conformation which is bulbous in nature. These bulbous lateral edges are accommodated in guiding tracks which heretofore have been exclusively rectilinear and solely vertically disposed. These shades have not been incorporated into solar greenhouses or other such complex structures for purposes of providing selective shielding or shading.

Additionally available are rollers within which are provided internal motors of generally cylindrical conformation. These motors are utilized for selectively driving the associated rollers for taking up straps attached to shades or for rewinding shades and the like. Insofar as known, these motor-driven rollers have not been utilized in conjunction with structural members of solar greenhouses or the like in the manner which will be described in greater detail hereinbelow.

In copending application Ser. No. 455,475 referred to above, there is disclosed an arrangement in which two motor-driven rollers are employed for the selective drawing out of and taking up of a shade. Such an arrangement is useful but is more expensive and requires more electrical wiring than is necessary in the arrangement to be shown hereinbelow.

SUMMARY OF INVENTION

A general object of the invention is to provide simplified systems and structural members to enable the selective shading and shielding of solar greenhouses and the like inclusive of, but not limited to, the selective erection of shielding walls relative to swimming pools and other such accommodations.

It is a further object of the invention to provide improved structural elements suitable for use in solar greenhouses and the like in order to provide for ready installation of shading systems and so forth.

Another object of the invention is to incorporate into a solar greenhouse or the like a bottom sill construction confining a concealed chamber in which rollers are installed for purposes of rolling up insulating and shading fabric cables for purposes of providing for selective shading.

It is yet a further object of the invention to provide for a multiplicity of shade panels which may be activated simultaneously or selectively in correspondence with panels incorporated into a solar greenhouse construction.

It is moreover an object of the invention to provide for a shading system associated with a spring loaded roller or the like.

A further object of the invention is to provide for an improved insulating and shading system which utilizes a power ventilating installation to extract heat which may be trapped between glazing and the associated shading system thus effectively reducing the heat build up between these elements and to avoid potential thermal overloads on the glazing system.

Still another object of the invention is to provide an improved insulating and shading system which may be added to a host structure readily at any time after the host structure has been completed.

It is an additional object of the invention to provide an improved tracking system which fixes the spacing between an associated glazing arrangement and shading system to minimize the possibility of damage to the glazing.

It is still a further object of the invention to provide for the incorporation of improved track channels into a structural member to provide in turn for ready displacement for a shade or shielding fabric or the like through a curved-eave portion in such a manner as to eliminate the need for associated guide rollers or other surplus structure, thereby simplifying the construction of shading and insulating systems and minimizing the cost thereof.

In achieving the above and other objects of the invention, there is provided a solar greenhouse which comprises a glazing supported by a support to define an enclosed space. The glazing is generally permeable to solar radiation to allow the radiation to pass into the space. A shade is provided in the space and is adapted for being drawn across at least part of the glazing whereby to intercept at least part of the radiation passing through the same. The shade has first and second ends, respectively coupled to a first arrangement which applies a constant force to the same. The second end is coupled, by way of example, to a motorized roller which serves to play out or take up the shade whereby to control the intercepting of the radiation.

The device which applies the constant force to the first end of the shade does so in a direction consistent with or tending to cause the shade to be played out from the motorized roller which, in turn, is operated by a control which enables the shade to be raised or lowered. The motorized roller or the like is substantially stronger than the device for applying the constant force. In fact, the device applying the constant force may be in the nature of a gravity device having sufficient strength to overcome the friction which exists between the shade and any guide device which may be utilized to guide the same. Thus, the device for applying the constant force is effective to keep the shade fully drawn out thereby to prevent wrinkling and tearage and other problems without being sufficiently strong as to interfere with the operation of the motorized roller or any equivalent device which may be substituted therefor.

In a preferred embodiment of the invention, the device for applying a constant force is a device for exerting a constant torque. It preferably includes two rollers with a cable coupling the shade to one of the rollers and with a spring being curled around the other roller. The spring is reverse curled onto the roller to which the cable is connected. The roller to which the cable is connected includes two axially spaced sections, one of which receives the cable and the other of which receives the spring. The section which receives the spring includes a central depressed section into which is guided the lead tongue of the spring.

In accordance with a detailed aspect of the invention, there is provided a bracket which straddles and supports the roller having the two sections. An extension is provided on the bracket for supporting the other roller at a fixed distance from the first roller. Both rollers are supported preferably in free wheeling relationship and with parallel axes. Specifically, the rollers have effective roller surfaces having diameters which are substantially equal and which surfaces are spaced from each other by a distance in the order of magnitude of one the diameters. The spring which is employed is preferably of a flat tempered stainless steel.

As has been noted generally hereinabove, the motorized roller constitutes a preferred means for raising and lowering the associated shade. The motor is located internally of the roller in a preferred embodiment. According to another aspect of the invention, the motorized roller referred to above defines an axis of rotation which is generally perpendicular to the axes of rotation of the rollers of the device which applies the constant force.

As has been generally noted above, and as will be explained more fully hereinbelow, the arrangement of the invention is such as to employ cables connecting the lower end of the shade to the device applying the constant force. This means that only a cable or a plurality of cables is to be taken up thereby avoiding the need for storing any portion of the shade on a rolling-up device at the bottom thereof. This enables the employment of a base sill having a relatively simple internal construction.

The use of the arrangement of the invention makes it possible further to simplify the electrical controls involved. Since a spring device is normally employed at the bottom of the shade, there will be required only one electrical arrangement at the top of the shade to effect the rolling out and taking up of the shade employed.

The above and other objects, features and advantages of the invention will be found in the detailed description which follows hereinbelow, as illustrated in the accompanying drawings.

BRIEF DESCRIPTION OF DRAWING

In the drawing:

FIG. 7 is a top view of the construction of FIG. 5; and

DETAILED DESCRIPTION

The complete disclosure and drawing of copending application Ser. No. 455,475 filed Jan. 4, 1983 are incorporated into the following description, as though set forth in detail herein.

Figure 1:
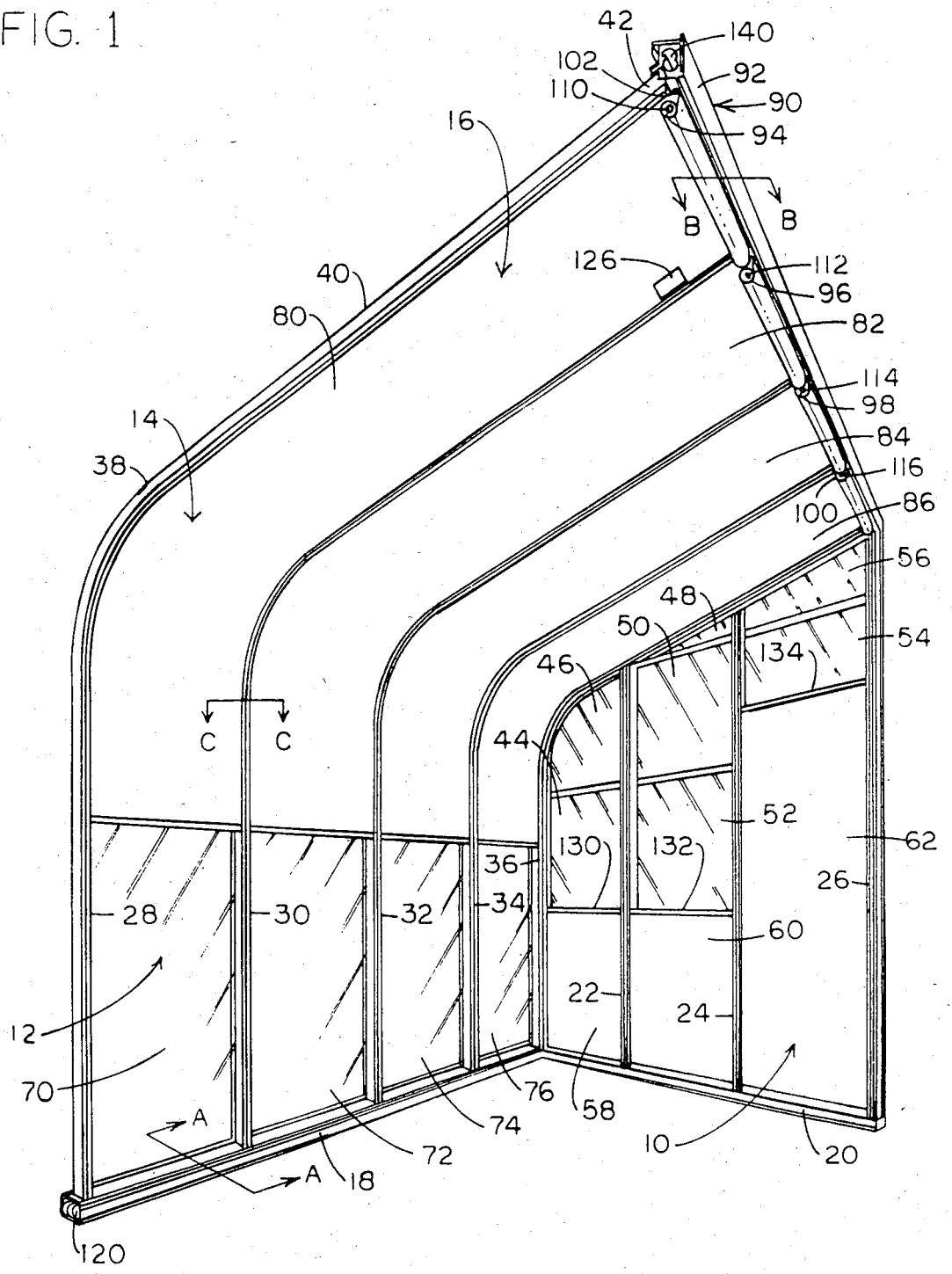
FIG. 1 is an interior perspective view of a portion of a lean-to type solar greenhouse provided with a shading arrangement in accordance with a preferred embodiment of the invention.

In FIG. 1 is illustrated a portion of a lean-to type solar greenhouse of the kind generally in the 1982 Theme Catalog entitled Four Seasons Passive Solar Greenhouse and Sun Space published and distributed by Four Seasons Solar Corp. of Farmingdale, N.Y. The illustrated portion of the Solar Greenhouse in FIG. 1 includes a gable end 10 and a front portion 12 having a curved-eave portion 14 and an upper sloped portion 16. Further illustrated are base sills 18 and 20 which may, for example, be mounted on a base wall or flat slab or deck (not shown) with appropriate fasteners. The method of mounting the base sill on the supporting ground is not a feature of the present invention and requires no further description in this text. The gable end 10 includes a plurality of parallel vertical glazing bars such as indicated at 22, 24 and 26. The bar 26 is in abutting relationship against the side of a dwelling or some other such similar construction. The front portion 12 includes a plurality of vertical glazing bars 28, 30, 32, 34 and 36. The glazing bar 36 furthermore provides a connection with gable end 10.

To conform with the shape of the glazing, which it is the purpose of the glazing bars to support, the glazing bar 28 has a curved section 38 and a sloped section 40. It terminates in an end portion 42. Glazing bars 28, 30, 32, 34 and 36 have similar curved and sloped portions.

Glazing panes as comprised by the gable end 10 are indicated in various forms at 44, 46, 48, 50, 52, 54, and 56. Portions of the glazing are concealed by shade fabric as indicated at 58, 60 and 62. The dwelling or other structure against which the solar greenhouse is mounted is not shown as its construction is not essential to an understanding of the present invention.

The glazing included in the front portion 12 includes glazing panes 70, 72, 74 and 76. The remaining glazing in FIG. 1 is concealed by shade fabric or shades 80, 82, 84 and 86. The number of shades and panels in FIG. 1 is illustrative only as a greater or lesser number of panels and glazing panes may be employed in accordance with the invention which is not limited thereby.

At the upper end of the solar greenhouse construction, is located a ridge structure 90. It engages the end portion of the glazing bars at the upper extremities thereof such as indicated at 42 to support and accommodate the same. The ridge structure 90 abuts at the back wall 92 against the dwelling or other similar structure associated therewith as does the vertical glazing bar 26 of the gable end 10.

Also appearing in FIG. 1 is a representative sequence of rollers 94, 96, 98 and 100. These rollers in the illustrated embodiment are source rollers of shade fabric which store or supply the rolled up shade fabric upon demand. Further illustrated in FIG. 1 is a guide roll 102 which guides the shades or shade fabric in a change of direction so that the edges of these shades or fabrics may be engaged in track channels provided in the vertical glazing bars as will be described in greater detail hereinbelow. It is to be noted in the diagrammatic illustration of source rollers 94, 96, 98 and 100 that interior motors 110, 112, 114 and 166 are shown. These motors are contained and concealed within the rollers and operate to drive the same. Rollers with internal motors to drive the same are commercially available. They may be obtained from Somfy Systems, Inc. of Edison, N.J. The motors are of a asynchronous capacitor start and run, single phase type rated at 120 V. and 60 Hz. They are thermally protected totally enclosed brushless type motors equipped with permanently lubricated bearings requiring no maintenance and being relatively easy to wire. They include solenoid activated disc brakes which automatically stop and hold a load in any position without slippage whenever current to the motor is interrupted. The locking action assures safety and reliability of operation of the motorized system. The system can be provided with a limit switch to set the exact length of travel in both up and down directions automatically. A planetary type gear system is employed to lower motor speed and improve torque. Other details of the motor system can be found in U.S. Pat. No 3,718,215.

The upper motorized rollers cooperate with spring and/or roller arrangements concealed in the base sill 18. In the illustration, one roller arrangement is exposed by the cutaway such as, for example, seen at 120. The arrangement is such that the rollers in the sill 18 yieldingly permit the shades to be drawn upwardly but tend to exert a constant force to draw the shades downwardly into position to intercept solar radiation.

Also illustrated in FIG. 1, in diagrammatic form, is a photoelectric sensor 126. This photoelectric sensor is coupled in an electric circuit (not shown) connected with the afore-mentioned motors in order to drive the same in one or the other rotary directions as may be required. The photoelectric sensor 126 is representative only of any device capable of sensing an ambient condition such as solar radiation, temperature, wind and the like for purposes of automating the operation of the rollers. A manually operated shade arrangement is indicated in association with end 10. Thus, there are no upper rollers associated with shades 58, 60 and 62, these being drawn from concealed rollers in base sill 20 by a manual operation of grasping rigid leading edge members indicated by way of example at 130, 132 and 134.

Also exposed in the illustration of FIG. 1 in diagrammatic form is a blower 140. The purpose of this blower (as will be illustrated and described in greater detail hereinbelow) is to evacuate air from between the shade and the associated glazing and to expel this air into the ambient atmosphere via an appropriate vent in order to reduce the temperature which prevails between the shades and the glazing thereby to reduce the possibility of damage to the glazing.

Figure 2:
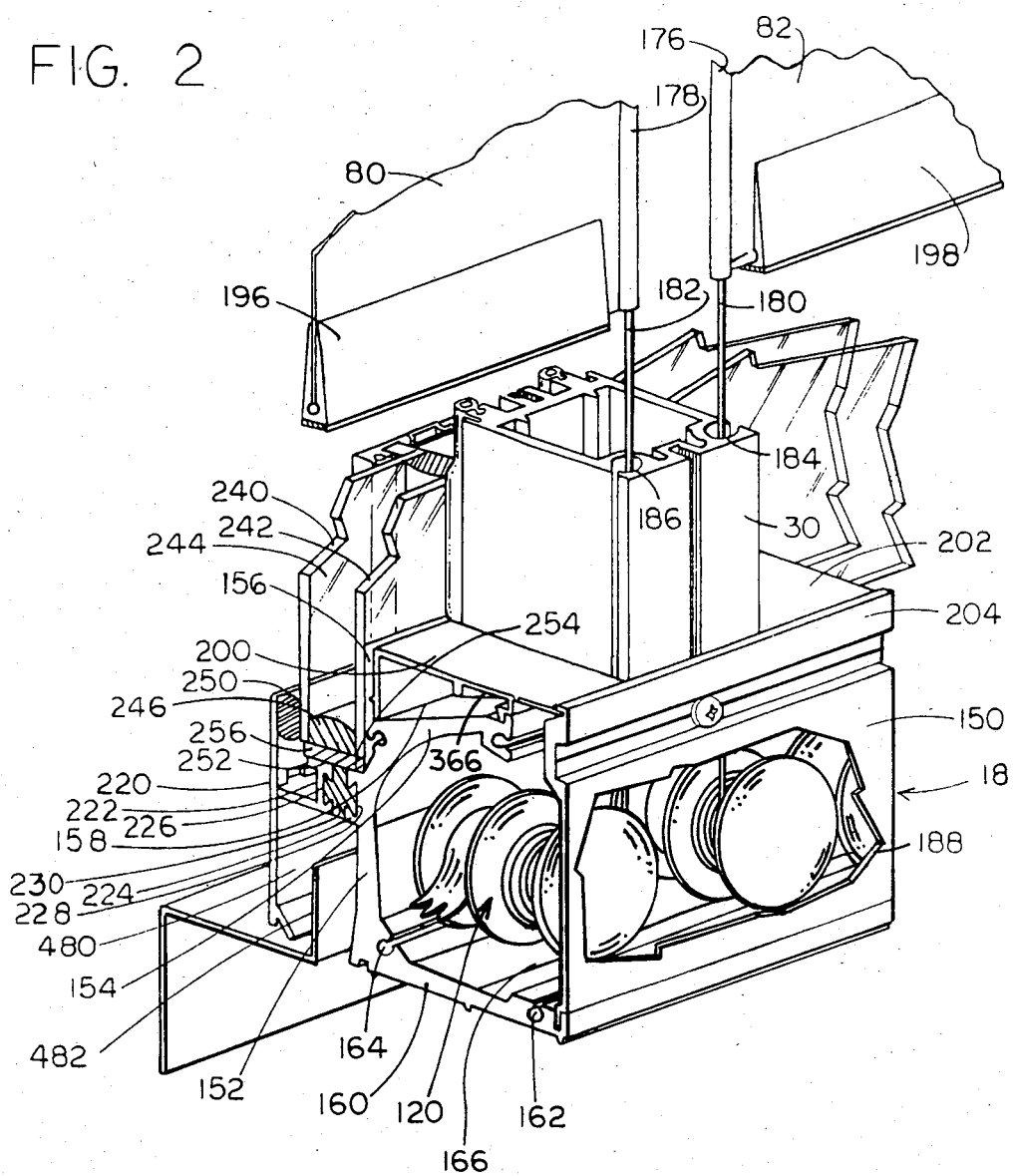
FIG. 2 is a partly diagrammatic and perspective view of a broken-away portion of the bottom sill construction embodied in the structure of FIG. 1 in correspondence with line A—A in FIG. 1.

FIG. 2 illustrates on an enlarged scale a broken-away portion of the structure illustrated in FIG. 1 with conditions somewhat altered to show a more lowered condition of the shades. For purposes of orientation, it will be seen in FIG. 2 that there are illustrated base sill 18, vertical glazing bar 30 and shades 80 and 82. The base sill 18 includes an inner wall 150 and a first outer wall 152. The outer wall 152 supports a sloped upper wall 154 from which extends a vertical wall 156. The walls 154 and 156 cooperate to define a moisture drain 158. A bottom wall 160 extends between and connects the inner wall 150 with the outer wall 152. Drainage channels 162 and 164 are provided in horizontal disposition within the internal chamber 166 which is cooperatively defined by walls 150, 152, 154 and 160. Within the chamber 166 are accommodated the roller systems including the rollers and associated springs to be described hereinafter.

Each of the shades illustrated includes a bulbous lateral edge portion for purposes of being accommodated in and guided by track channels to be referred to hereinbelow. Illustrative bulbous lateral edge portions or peripheries are indicated at 176 and 178 in FIG. 2. These constructions are commercially available and are generally of the type including wires extending through the bulbous peripheries and extending axially out of the same. Two such wires or cables are indicated at 180 and 182 in FIG. 2. They extend through and are guided by track channels 184 and 186 as will be described in greater detail hereinbelow.

By reason of broken-away portion 188, it is possible to see that cables 180 and 182 are attached to and wound onto rollers. A winding up of these cables on the associated rollers causes the shades 80 and 82 to be drawn down towards the base sill 18 thereby to effect a greater degree of shading. This means that solar radiation passing through the glazing which is permeable thereto may be intercepted by the shades thereby to effect a greater or lesser degree of shielding as controlled in accordance with the invention. It will also be noted in FIG. 2 that the shades 80 and 82 are provided with rigid lead members 196 and 198. These members, at their extreme downward movement, may come into abutting or substantially abutting relationship with cap elements 200 and 202 which are intended to cover drains such as indicated at 158 as well as to conceal the internal construction of the base sill 18 from viewing or from the damaging impact of dropped articles or the like. The caps 200 and 202 also constitute safety features inasmuch as they resist the penetration of probing fingers and the like which might otherwise be damaged by engagement with moving parts within the base sill 18 under inadvertent circumstances.

The cap members 200 and 202 extend generally from the vertical wall 156 to the upper lip 204 of the front wall 150. This is satisfactory in the case where the cables, such as indicated at 180 and 182, extend through the glazing bar to the internal rollers 172 which act as take-up rollers. In these circumstances, there is no need for the lead members 196 and 198 to move into the internal chamber 166 nor is there any need for the shades 80 and 82 to move into chamber 166.

FIG. 2 furthermore illustrates a second outer wall 220. This outer wall includes a protrusion 222 in facing relationship with a protrusion 224 on the outer wall 152. These two protrusions are provided with facing grooves 226 and 228 which have reentrant angles therein so that a thermal break member 230 having the form of a Maltese cross may be entrapped therein to prevent the flow of heat from the wall 152 to the wall 220.

The glazing is illustratively shown in the form of a double paned glass or plastic structure, the spaced panes being indicated at 240 and 242 with a spacing 244 therebetween. To maintain this spacing, there is provided a spacer 246. The pane 242 rests against the vertical wall 156 and the glazing as a whole is entrapped between the walls 156 and 220 by means of a gasket 250 of a thermally insulative type. The upper ends of protrusions 222 and 224 define a platform at 252 and 254 upon which rests a pad 256 upon which rest the glazing and the spacer 246.

Figure 3:
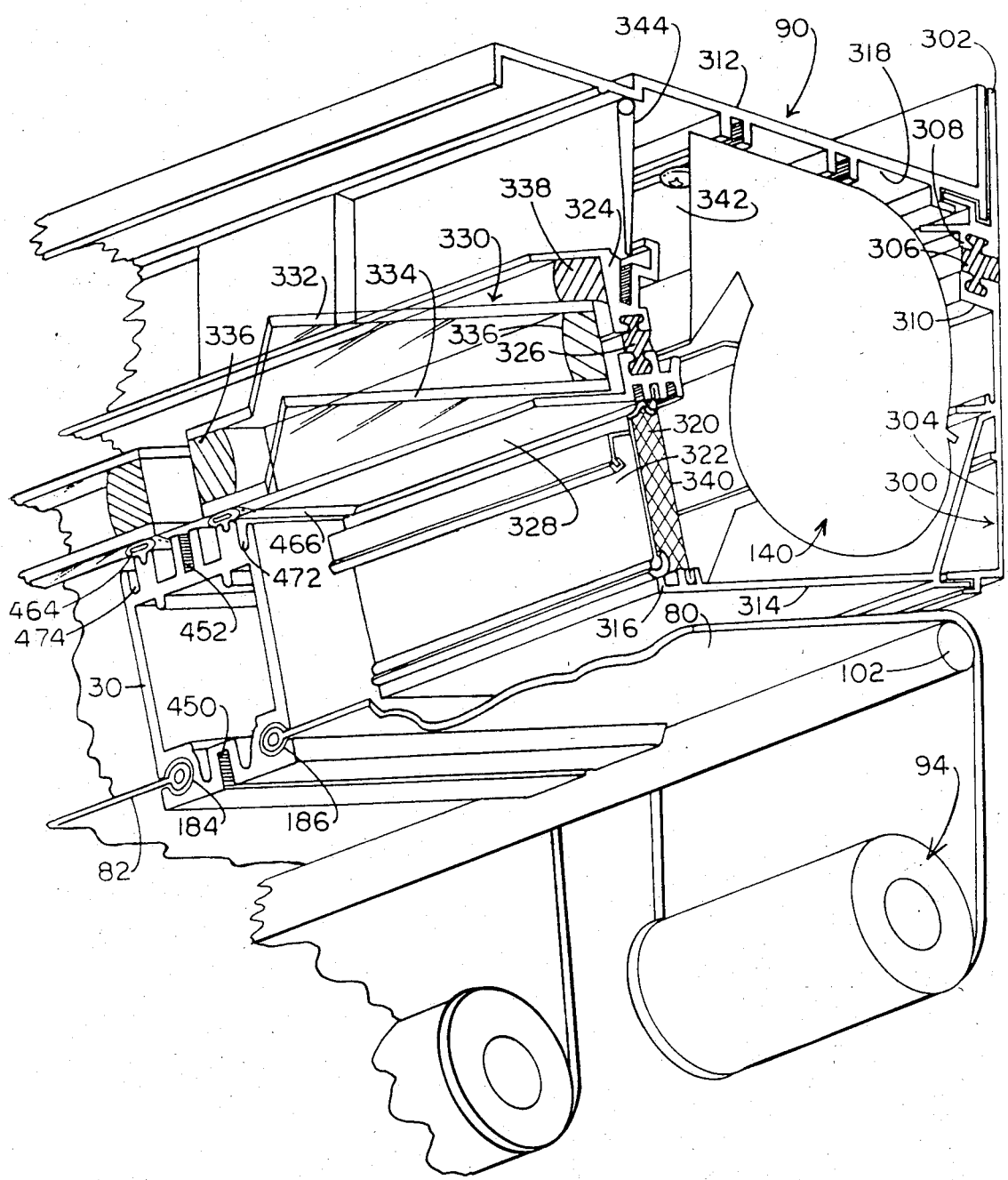
FIG. 3 is a view of the ridge structure of FIG. 1 in correspondence with line B—B therein, the view being on enlarged scale and being partially diagrammatic in nature.

Further reference to the construction of the vertical glazing bar 30 will be made hereinbelow, especially as regards the provision of the track channels 184 and 186. Before this discussion is undertaken, however, reference will next be made to FIGS. 3 and 4 which illustrate, in greater detail and/or diagrammatically, some of the features of the ridge structure 90 appearing in FIG. 1. For purposes of orientation, attention is drawn in FIGS. 3 and 4 to vertical glazing bar 30, shades 80 and 82, motorized roller system 94, guide roll 102 and blower system 140 which have been mentioned hereinabove.

The glazing bars 30 constitute supporting members or structures for the glazing. These supporting members are accommodated in and rest against the ridge structure 90. They provide track channels for receiving and guiding the respective shades. The ridge member 90 is structurally and functionally related therewith in a manner next to be described below.

Ridge structure 90 includes a rear wall 300 consisting of upper and lower parts 302 and 304. The upper and lower parts are connected through the intermediary of a thermal break member 306 which is made of insulative material accommodated in appropriate receptacles 308 and 310 respectively provided on the upper and lower parts 302 and 304. The ridge structure 90 also includes upper wall 312 and lower wall 314. Moreover, it includes a front wall indicated at 316. Cooperatively, these walls define an internal chamber 318 within which is accommodated the blower 140.

The front wall 316 is provided with a vent indicated generally at 320. Associated with this vent is a removable shutter 322 which may be employed, for example, during cold weather seasons to shut off the escape of air from within the solar greenhouse. The front wall 316 has an auxiliary portion 324 connected thereto through the intermediary of a thermal break member 326. This auxiliary member 324 supports a receptacle 328 which is a glazing receptacle to accommodate and support appropriate glazing panels at the upper extremity of the front portion of the glazing of the solar greenhouse. An examplary panel is diagrammatically illustrated at 330. It may consist of spaced panes 332 and 334 separated, for example, by a spacer 336. The panel 330 is held in place by a gasket shown at 338. A screen for preventing the influx of insects and the like is indicated at 340. It is associated with the vent 320. A second vent is indicated at 342. Cooperating therewith is a gravity operated flap 344 which likewise prevents the influx of foreign matter. The force of the flow of air passing outwardly through the vent 342 is sufficient to open the flap 344 to the extent required.

Figure 4:
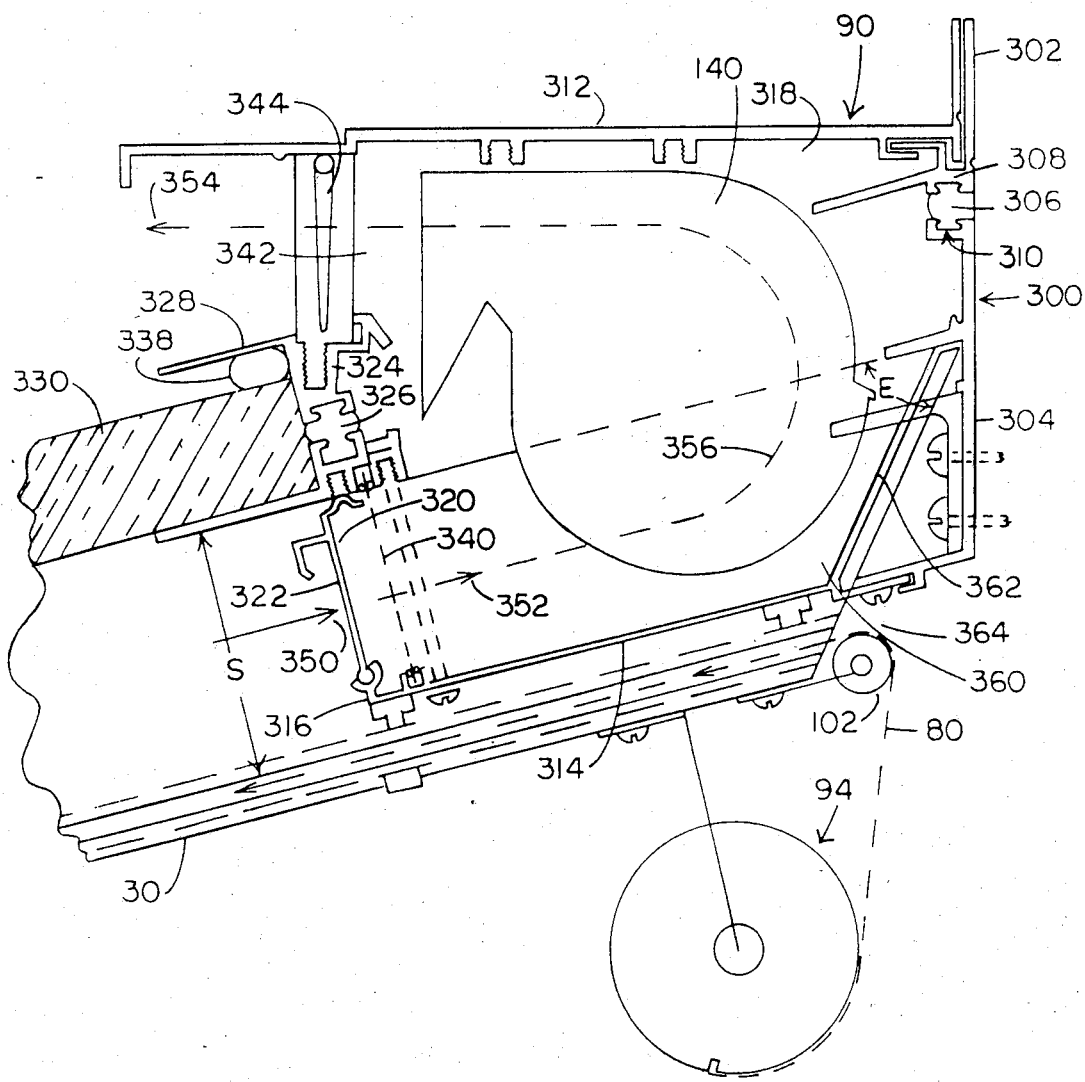
FIG. 4 is a partially diagrammatic view corresponding section line B—B of FIG. 1.

FIG. 4 specifically illustrates the flow of air. Flow through the vent 320 is indicated by arrows 350 and 352. Flow of air through vent 342 is indicated by arrow 354. The circuitous route is indicated by dotted-line path 356. It will now be noted that the utilization of the glazing bar with its track channels 184 and 186 and the function of supporting the associated glazing defines a space between the shades and glazing. This space is indicated in FIG. 4 at S. This spacing S is a minimum of about 1½ inches. It is intended to assist in limiting the temperature which air entrapped between the glazing and shade can reach. This function is further accomplished by the utilization of the blower 140 which displaces or withdraws air from between the glazing and the shades and propels this air along the route 350 through the vent 320 and expels this air into ambient atmosphere through the vent 342. The ridge structure and its blower cooperate with the blazing bar and the shades in both a structurally supportive and temperature controlling manner.

It will now be noted that the end portion 360 at the upper extremity of the glazing bar 30 has an extremity indicated at 362 which is angularly related both to the longitudinal axis of bar 30 and to the rear wall 304 of the ridge structure 90. This is intended to provide a space 364 within which to accommodate at least a partial intrusion of the guide roll 102. Thus the guide roll 102 may be conveniently positioned to guide the shade 80 from the roller system 94 into the associated track channels.

Similarly, the bottom extremity of the glazing bar 30 as indicated at 366 in FIG. 2 is angularly related to the walls between which it extends. The purpose of this angular construction is different from that at the upper extremity. It is intended to provide an appropriate relationship with the drain 158 thereby to permit a proper resting of the bottom extremity of bar 30 on the upper wall 154 and to permit ease in installing the glazing bar 30 when the structure is being assembled.

In my copending application, the shades are vertically oriented and for each shade a motorized roller is provided at both the top and bottom ends. In the structure of the instant application a motorized roller is employed at the top end only. The function of this motorized roller is to play-out and take-up the associated shade which is either uncoiled from or coiled upon the motorized roller which serves as a storage for the portion of the shade which is not being employed for radiation interception. As in the structure of said copending application, glazing bars are preferably employed in the structure of the instant invention, which provide for forming track channels in which the bulbous perepheries of the lateral edges of the associated shades are entrapped and guided. The guiding of the bulbous peripheries of the shades involves a certain amount of friction and if no force were to be employed at the lower end of the shade, binding of the shade would occur and the shade might be wrinkled and torn or its operation otherwise interfered with. To avoid this problematical result, the invention substitutes for the motorized roller at the bottom of the structure in said copending a device the purpose of which is to overcome the friction forces involved in guiding the shade without interference with the operation of the motorized roller. In accordance with the invention, the device preferably employed exerts a constant force, since a device applying a varying or variable force would generate various problems in use. A suitable device which is employed in the preferred embodiment of the invention, is shown in detail in FIGS. 5-7.

Figure 5:
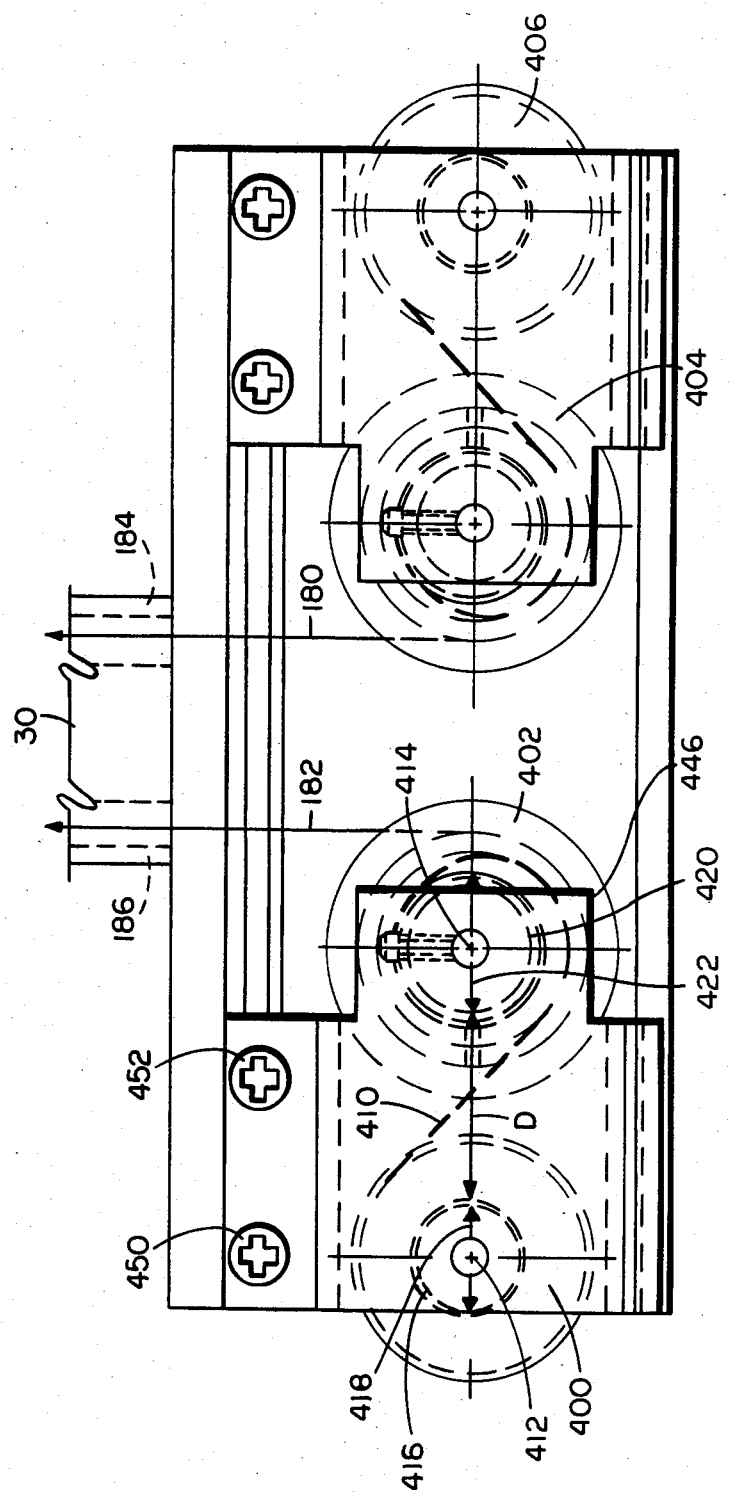
FIG. 5 is a side view partially hidden illustrating a spring device for applying a constant force with constant torque and constituting details of what has been generally shown in FIGS. 1 and 2.
Figure 6:
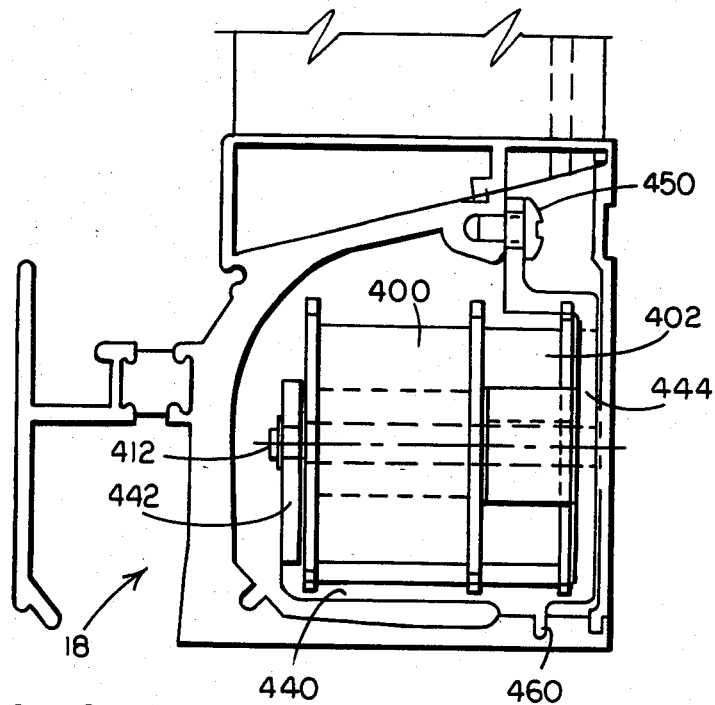
FIG. 6 is an end view of the construction of FIG. 5.

In FIGS. 5-7 reference is first made to glazing bar 30, track channels 184 and 186 and base sill 18 for purposes of orientation. In a-propriate relationship thereto are illustrated to pairs of rollers. One pair of rollers includes rollers 400 and 402. This pair of rollers is associated with cable 182 guided in track channel 186. The other pair of rollers includes rollers 404 and 406. This pair of rollers is associated with cable 180 guided in track channel 184. As both of these pairs of rollers function in a similar manner (albeit in mirror reflection of one another), only the operation of one of these pairs of rollers (i.e., rollers 400 and 402) will be described.

The heart of the operation of each pair of rollers consists of a constant force or constant torque spring. Such springs are independently and previously known and are commercially available. One particular source of this type of spring is Vulcan Spring & Manufacturing Co. of Huntington Valley, Pa. 19006. A constant force spring is a spring which is designed to apply a specific force throughout the entire extension of the spring. Preferably steel bands are employed. These steel bands are coiled and extended. Linear resisting forces tend to recoil the steel. Unlike conventional springs, which function with cumulative forces, the constant forces spring is designed to operate without cumulative forces. They are ideal for applications requiring a zero gradient for large extensions. It is known that they can deliver more energy per pound of material than a gravity device. For example, it is known that a constant force spring weighing 1 pound can perform all of the functions of a 30 lb. counterweight and cable assembly. Preferably constant force springs are made of Type 301 stainless-spring steel. This material has proven superior for quality, life, corrosion resistance, stress retention and cost.

The springs of the invention, which will be referred to hereinafter, are preferably formed of high-quality stainless steel strips to which is applied a curvature. The magnitude and distribution of the resulting stresses are controlled through processing so that a constant pull of the spring will be directly related to material width and thickness. The parameters which effect the design include the material, the width, the thickness, the length, the natural diameter of the spring and the storage drum diameter to be referred to hereinbelow. Cables regarding these parameters may be found in Vulcan's 1974 catalog.

One such spring is seen in FIGS. 5-7 at 410. It is normally wound on roller 400 which constitutes the storage drum. The natural curl of spring 410 around drum 400 is in clockwise direction in FIG. 5. It is reverse coiled onto the take-up drum or roller 402. Rollers 400 and 402 are supported on shafts 412 and 414, respectively. These shafts, which define the axes of rotation of the respective rollers, are preferably parallel so that the axes of rotation are parallel. These axes of rotation are perpendicular to the axes of rotation of the associated motorized roller at the top of the associated shade.

The effective roller surface of the roller 400 is indicated at 416. This is the surface onto which the spring 410 is coiled. The effective diameter of the effective roller surface is indicated at 418. The effective roller surface of roller 402 is indicated at 420. The diameter of this surface is indicated at 422. The diameters 418 and 422 are substantially equal in size or are at least of the same order of magnitude. The effective roller surfaces are spaced apart by a distance D which preferably is equal to about 1 or 2 times the diameter of one of the effective roller surfaces.

As stated hereinabove, the spring 410 is of flat tempered stainless steel. Its thickness may vary within a wide range of thicknesses, such as, for example, between about 0.002 and 0.035 inches. In its natural unmounted state, these springs may have an inside diameter of, for example, about 0.30-5.0 inches. The inside diameter may be as large as 7.5 inches or, indeed, even greater. The outside diameter of the spring may vary for example between about 0.60 and 15.5 inches. These ranges are not limitative of the invention.

The cable take-up roller 402 includes a central section 430. This section accommodates the lead tongue 432 of the spring 410. The tongue 432 is connected to the depressed section 430 by means of a fastening bolt 434.

Within the base sill 18 is provided a bracket 440 including two side walls 442 and 444. This bracket includes an extension 446 upon which is mounted the shaft 414 for the roller 402. Walls 442 and 444 straddle the roller 400 and accommodate and support the shaft 412. The bracket is attached to the base sill through connecting members 450 and 452 which are accommodated in appropriately threaded recesses in the base sill. The bottom wall of the bracket 440 includes a tongue 460 which is accommodated in an appropriate recess in base sill 18 whereby to appropriately locate the bracket. Both rollers 400 and 402 are accommodated in freewheeling manner on shafts 412 and 414, respectively. That is to say, neither of the rollers are in fixed position. In operation, the playing-out of cable 118 from roller 402 will cause spring 410 to be reverse coiled from roller 400 onto roller 402 in accordance with the number of rotations caused by displacement of cable 182. The strength of the motorized roller 94 extering tension on cable 182 will be readily sufficient to overcome the strength of the spring 410. In fact, as will be referred to hereinbelow, the strength of spring 410 is merely adequate to overcome the frictional forces involved in the structure. Thus when the motorized roller is reversed and is effective to unwind or play out the associated shade, the force of spring 410 will be adequate to maintain the associated shade in straightened condition as would a gravitational force applied to the bottom of the shade. This will prevent the shade from binding in the guiding track and will thereby avoid the harm associated with such malfunctioning.

From what has been stated hereinabove, it will now be seen that there is provided a glazing structure which includes a glazing and which is provided with a first device (namely a motorized roller) and a second device (namely a constant force device) bracketing at least part of the glazing. A shade is connected between these devices and is adapted for being drawn across at least part of the glazing. The motorized roller is adapted for storing the shade and playing-out and rolling-up the same. The constant force device is coupled to the shade and applies force thereto tending to cause, or being in a direction consistent with causing the shade, to be played out from the motorized roller and drawn across at least part of the glazing. A control is provided to operate the motorized roller selectively to play-out our roll-up the shade. The motorized roller is stronger than the constant force device which is adequate only for overcoming friction between the shade and any associated guiding structure. The constant force device is thus adequate to maintain the shade in straightened condition, thereby to avoid a binding of the same in associated guiding tracks. As has been noted, the constant force device is preferably a constant force spring operating to exert a constant torque.

As has been described, a cable is employed to couple the shade to one of two rollers embodied in the constant force device and a spring is coiled around and stored on a storage roller. This spring is reverse coiled onto the roller onto which the cable is wound. The roller receiving the cable includes two sections (e.g., 402(a) and 402(b)) which are axially spaced from one another. One section receives the cable and the other receives the spring. At least one of the rollers includes a central depressed section into which is guided the lead tongue of the associated spring. A bracket straddles and supports at least one of the rollers and includes an extension for supporting the other of the rollers at a fixed distance therefrom. Both rollers are supported in free-wheeling relationship and with parallel axes.

Figure 8:
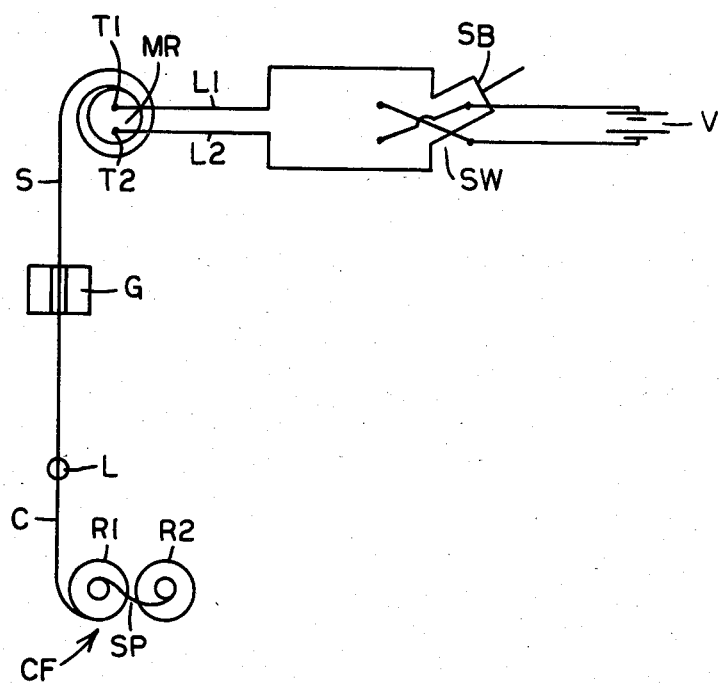
FIG. 8 is a diagrammatic sketch illustrating some of the operational features of the invention.

FIG. 8 illustrates diagrammatically some further general details of the operation of the device. At MR is indicated the motorized roller which serves to store shade S. The shade is either played out from or unrolled from the motorized roller MR or, on the other hand, is coiled onto and stored on this motorized roller. Two terminals T1 and T2 and illustrated as being connected to electric lines L1 and L2 connected to a switch SW having a switch blade SB which is reversing switch which serves to reverse the application of voltage from source V to terminals T1 and T2, thereby enabling the roller to rotate in one direction or the other. The roller MR is such that when no voltage is applied thereto, it is fixed in rotational position and will neither play out nor take up the associated shade S. To guide the shade S, as has been indicated hereinabove in greater detail, is provided a guide G. This guide may consist of the various track channels noted hereinabove. Between the shade S and guide G will exist certain frictional forces while the shade is moving. Such frictional forces might cause a wrinkling and binding of the shade S. Therefore, the bottom leading edge L of the shade is connected by a cable C to the constant force device CF embodying rollers R1 and R2 as aforesaid. These rollers are connected by means of reverse coiled spring SP in the manner which has already been indicated in substantial detail.

The force exerted by device CF is adequate to replace a corresponding gravitational force which might otherwise be employed to hold the shade S in straightened form. The device CF is, moreover, much weaker than the device or roller MR, which operates to take up and play out shade S virtually independently of the force exerted by device CF.

There will now be obvious to those skilled in the art many modifications and variations of the construction set forth hereinabove. These modifications and variations will not depart from the scope of the invention if defined by the following claims.

What is claimed is:

1. A solar greenhouse comprising glazing means, support means supporting said glazing means to define an at least partly enclosed space, said glazing means being permeable to solar radiation to allow said radiation to pass into said space, shade means in said space and adapted for being drawn across at least part of said glazing means whereby to intercept at least part of the radiation passing through said glazing means, said shade means having first and second ends, first means coupled to said first end and adapted for applying a constant force to said first end, second means coupled to said second end and selectively functioning to play out or take up said shade means whereby to control intercepting of the radiation, said second means including a roller and power means to drive the roller and roll the shade means thereupon or unroll the shade means therefrom, said first means being a constant torque means, said first means including a roller and a spring coupled to and tending to rotate said roller of the first means with a constant torque, and a cable coupling said first end of the shade means to the roller of the first means whereby the cable and not the shade means is rolled onto the roller of the first means.

2. A solar greenhouse as claimed in claim 1, wherein the rollers of the first and second means define axes of rotation arranged in generally perpendicular planes.

3. A solar greenhouse as claimed in claim 2, wherein the second end of the shade means is connected directly to the roller of the second means.

4. A solar greenhouse as claimed in claim 2, wherein the roller of said first means includes axially adjacent sections, said cable being coupled to one section and said spring being coupled to the other section.

5. A solar greenhouse as claimed in claim 4, wherein said first means comprises a second roller adjacent the first said roller of the first means and having an axis of rotation parallel to the axis of rotation of the first roller of the first means.

6. A solar greenhouse as claimed in claim 5, wherein said spring is a flat spring tending to coil up on said second roller, said spring being connected to said first roller and being progressively coiled thereupon when the power means operates the roller of the second means to roll the shade means thereupon.

7. A solar greenhouse as claimed in claim 6, wherein the second roller of the first means includes a recessed central section and said spring includes a tongue received in and coupled to said central section.

8. A solar greenhouse as claimed in claim 6, wherein said support means is provided with at least one track channel supporting the glazing means, said shade means being laterally engaged in and guided along said glazing means by said track channel.

9. A solar greenhouse as claimed in claim 8, wherein said glazing means includes a curved portion along which extends said support means and said channel.

10. A solar greenhouse as claimed in claim 8, wherein said support means includes at least two spaced and parallel glazing bars supporting and spanned by at least a part of said glazing.

11. A solar greenhouse as claimed in claim 10, wherein each of said glazing bars is provided with at least one said channel, the channels in said bars being aligned in parallel, said shade means extending between one said channel in one of said bars and one said channel in the other of said bars.

12. A solar greenhouse as claimed in claim 11, wherein said shade means includes parallel bulbous lateral peripheries engaged in respective of said channels.

13. A solar greenhouse as claimed in claim 12, wherein said channels are provided with relatively narrow slot-type mouth openings from said bars whereby to admit the entry of said shade means and to entrap the bulbous peripheries in said channels.

14. A solar greenhouse as claimed in claim 13, wherein said cables extend in part through said channels.

15. A solar greenhouse as claimed in claim 14 comprising a horizontal sill below and supporting said support means, said first means being contained within said sill.

16. A solar greenhouse as claimed in claim 1, wherein said first means includes a second roller, said constant torque spring means coupling the two rollers of said first means and tending to rotate the first said roller of said first means to wind the cable means onto the same.

17. A glazing structure comprising a glazing, first and second means bracketing at least part of said glazing, shade means adapted for being drawn across at least part of said glazing, said second means being adapted for storing said shade means and playing out and rolling up the same, said first means being coupled to said shade means and applying a force thereto tending to cause said shade means to be played out from said second means and drawn across at least part of said glazing, and control means to operate the second means selectively to play out or roll up said shade means, said second means being stronger than said first means, guide means for guiding the shade means across the glazing, there being friction between the shade means and guide means, said first means being of a strength to overcome said friction, the first means being a means to exert a constant force on the shade means and being a means to exert a constant torque, and said first means comprising first and second rollers, a cable coupling said shade means to said first roller, and spring coiled around said second roller, said spring being reverse coiled onto said first roller.

18. A glazing structure as claimed in claim 17, wherein said first roller includes two axially spaced sections one of which receives said cable and the other of which receives said spring.

19. A glazing structure as claimed in claim 18, wherein said other section of said first roller includes a central depressed section and said spring includes a lead tongue received in said depressed section.

20. A glazing structure as claimed in claim 19 comprising a bracket straddling and supporting said first roller and an extension on the bracket supporting said second roller at a fixed distance from the first roller.

21. A glazing structure as claimed in claim 20, wherein the first and second rollers are supported in free wheeling relation and with parallel axes.

22. A glazing structure as claimed in claim 21, wherein the first and second rollers have effective roller surfaces having diameters which are substantially equal and which surfaces are spaced from each other by a distance in the order of magnitude of one of the diameters.

23. A glazing structure as claimed in claim 21, wherein the spring is of flat tempered stainless steel.

* * * * *